(12) United States Patent
Chao

(10) Patent No.: US 7,384,222 B2
(45) Date of Patent: Jun. 10, 2008

(54) HOLE SAW

(75) Inventor: Walley Chao, 3F, No. 157, Sec. 1, Mei Tsun Rd., Taichung (TW)

(73) Assignee: Walley Chao (TW)

( * ) Notice: Subject to any disclaimer, the term of this patent is extended or adjusted under 35 U.S.C. 154(b) by 44 days.

(21) Appl. No.: 11/585,812

(22) Filed: Oct. 25, 2006

(65) Prior Publication Data

US 2007/0258780 A1 Nov. 8, 2007

(30) Foreign Application Priority Data

May 8, 2006 (TW) .............................. 95207856 U

(51) Int. Cl.
*B23B 51/04* (2006.01)
(52) U.S. Cl. ...................... 408/206; 408/204
(58) Field of Classification Search ................ 408/204, 408/206, 207, 209, 703; B23B 51/04, 51/05
See application file for complete search history.

(56) References Cited

U.S. PATENT DOCUMENTS 6,206,616 B1 * 3/2001 Smith et al. ................ 408/1 R
6,893,194 B2 * 5/2005 Jones et al. ................ 408/204

FOREIGN PATENT DOCUMENTS

| DE | 2410120 A1 | * | 9/1975 |
| DE | 3214209 A1 | * | 10/1983 |
| DE | 3423522 A1 | * | 1/1986 |
| DE | 3541477 A1 | * | 5/1987 |
| EP | 458047 A1 | * | 11/1991 |
| GB | 1501198 A | * | 2/1978 |
| GB | 2364662 A | * | 2/2002 |
| JP | 52014287 A | * | 2/1977 |
| JP | 58010415 A | * | 1/1983 |
| JP | 09103906 A | * | 4/1997 |

* cited by examiner

Primary Examiner—Daniel W. Howell
(74) Attorney, Agent, or Firm—Browdy and Neimark

(57) ABSTRACT

A hole saw includes a shaft, a hole-cutter and an adjustable outer cutter unit. The shaft has a bottom coupling hole for receiving a pilot drill, a top coupling rod for fastening to a driving tool, and an outer thread extending around the periphery thereof. The hole-cutter has a top center inner thread threaded onto the outer thread of the shaft. The adjustable outer cutter unit has two locating rods perpendicularly affixed to the shaft at two sides in a line and two cutters respectively movably mounted on the locating rods, locked thereto with a respective lock screw and abutted against an outer periphery of said hole-cutter.

4 Claims, 5 Drawing Sheets

HOLE SAW

BACKGROUND OF THE INVENTION

1. Field of the Invention

The present invention relates to a saw and specifically, to a hole saw, which is practical to cut countersinking holes of different shapes and sizes.

2. Description of the Related Art

FIGS. 1 and 2 show a hole saw according to the prior art adapted to cut a stepped circular hole out of a wooden or metal plate member. According to this design, the hole saw comprises a hole-cutting saw blade device 50, a pilot drill 60, and a shaft 70. The hole-cutting saw blade device 50 comprises an outer cutter 52 and an inner cutter 54. The outer cutter 52 has an inner periphery abutted with the outer periphery of the inner cutter 54. Further, the outer cutter 52 has a plurality of cutting teeth 521 equiangularly spaced around the bottom of the outer cutter 52. The inner cutter 54 has a series of cutting teeth 541 extending around the bottom thereof. The pilot drill 60 has the head thereof fastened to the center hole of the shaft 70. When in use, the pilot drill 60 is rotated with the shaft 70 and driven into the workpiece to guide the cutting working of the hole-cutting saw blade device 50, and then the cutting teeth 541 of the inner cutter 54 are acted against the workpiece to cut a circular hole A out of the workpiece, and finally the cutting teeth 521 of the outer cutter 52 are acted against the workpiece to cut a circular hole B greater than the circular hole A, thereby forming a stepped circular hole.

According to the aforesaid prior art design, the hole-cutting saw blade device 50 comprises an outer cutter 52 and an inner cutter 54 fixedly arranged together. When the cutting teeth 541 of the inner cutter 54 or the cutting teeth 521 of the outer cutter 52 have sworn or are damaged during working, the outer cutter 52 and the inner cutter 54 cannot be separately replaced, and the whole hole-cutting saw blade device 50 must be replaced. Further, because the inner diameter of the outer cutter 52 must fit the outer diameter of the inner cutter 54 perfectly, different sizes of outer cutters 52 must be matched with different sizes of inner cutters 54 to set up a full range of hole-cutting saw blade devices. These problems greatly increase the cost.

SUMMARY OF THE INVENTION

The present invention has been accomplished under the circumstances in view. It is one objective of the present invention to provide a hole saw, which can be used with different cutters to cut countersinking holes of different sizes and shapes.

It is another objective of the present invention to provide a hole saw, which allows replacement of the cutters individually.

To achieve these objectives of the present invention, the hole saw provided by the present invention comprises a shaft, a hole-cutter and an adjustable outer cutter unit. The shaft has a bottom coupling hole axially inwardly extending from a bottom end of the shaft for receiving a pilot drill, a top coupling rod for fastening to a driving tool, and an outer thread extending around the periphery of the shaft. The hole-cutter is fastened to the shaft for rotation with the shaft. The hole-cutter has a top center inner thread threaded onto the outer thread of the shaft. The adjustable outer cutter unit comprises at least one locating rod transversely affixed to the shaft, and at least one cutter movably and lockably mounted on a side of the at least one locating rod and abutted against an outer periphery of the hole-cutter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
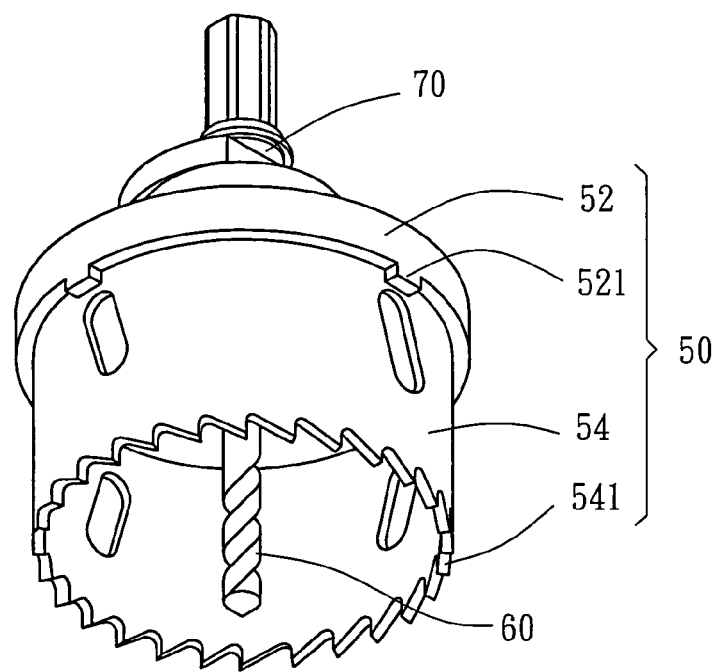
FIG. 1 is a perspective view of a conventional hole saw according to the prior art.
Figure 2:
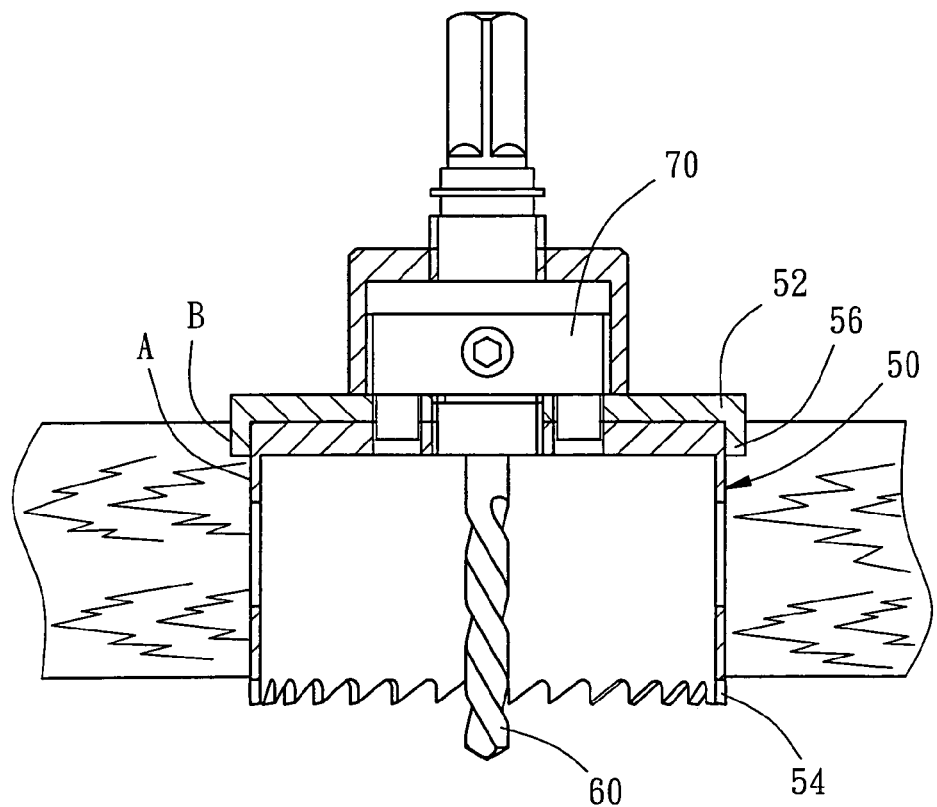
FIG. 2 is a schematic drawing showing the hole-cutting working of the conventional hole saw according to the prior art.
Figure 3:
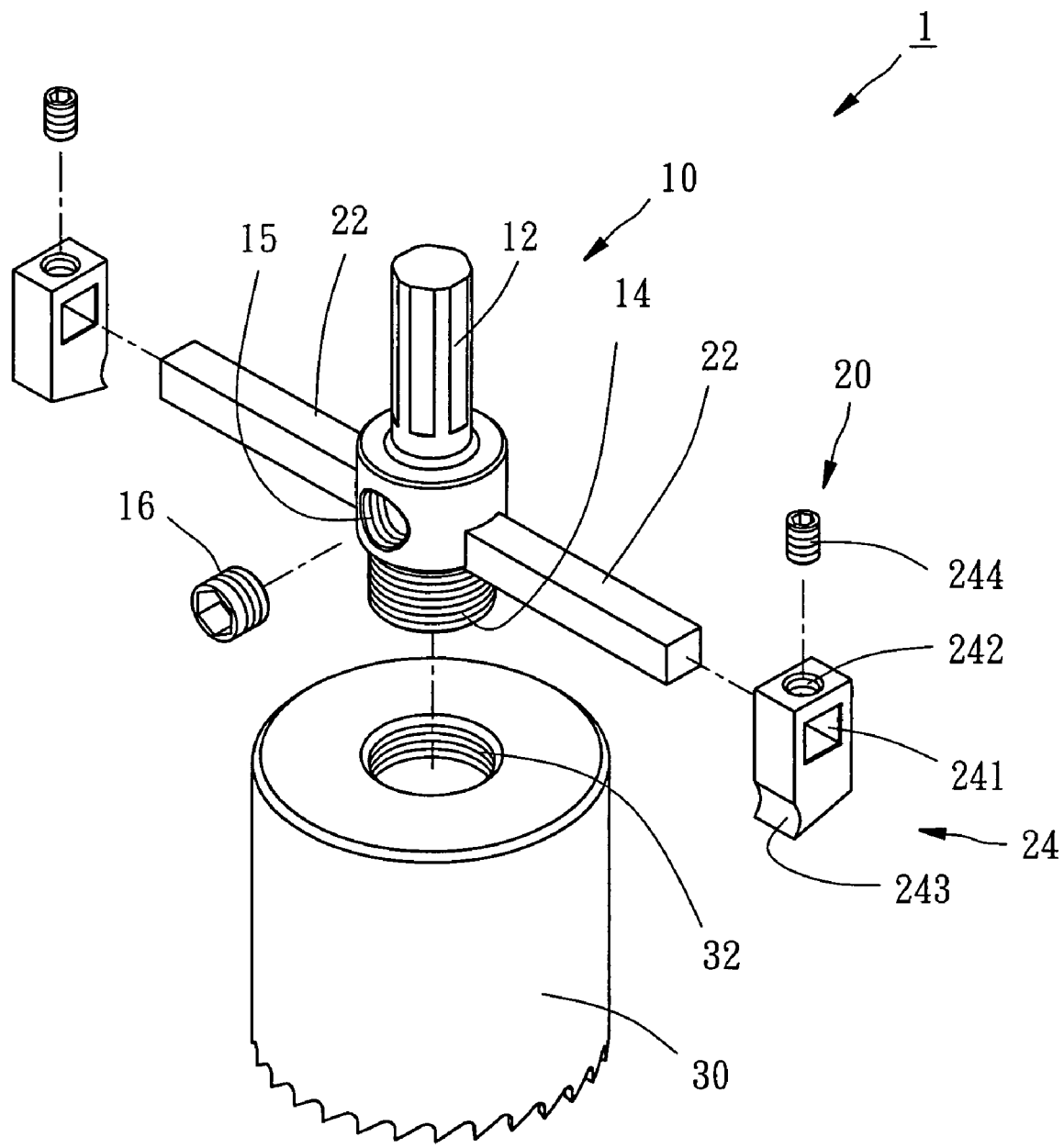
FIG. 3 is an exploded view of a hole saw according to a first preferred embodiment of the present invention.
Figure 5:
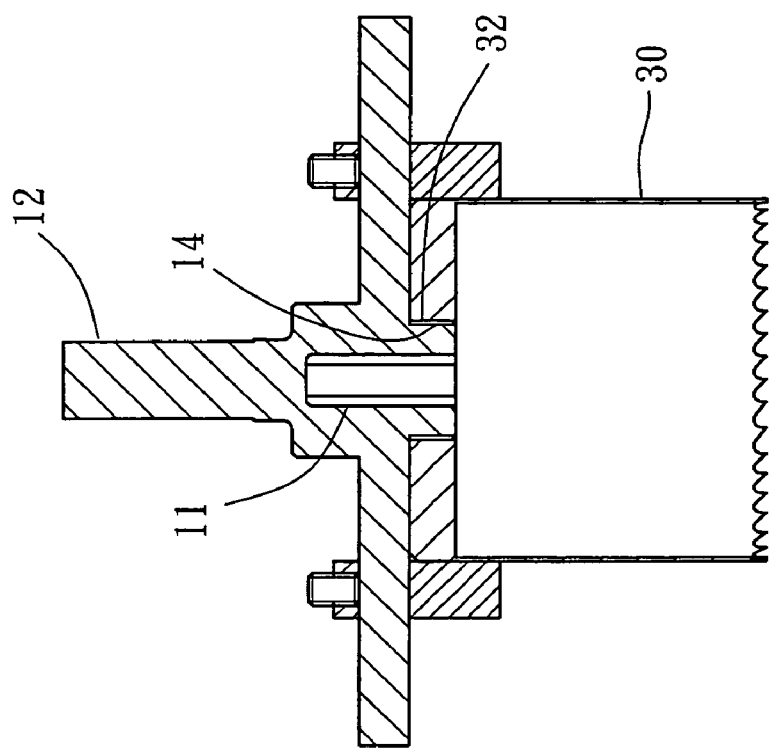
FIG. 5 is a sectional view taken along line 5-5 of FIG. 4.
Figure 4:
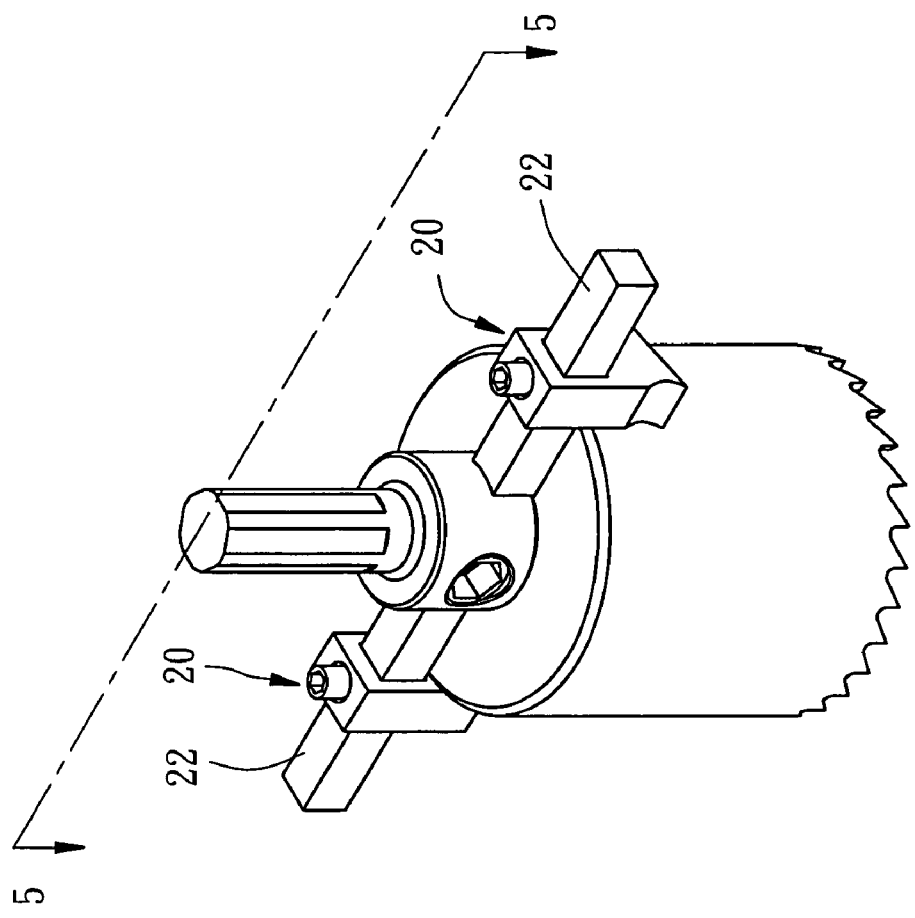
FIG. 4 is a perspective assembly view of the hole saw according to the first preferred embodiment of the present invention.

As shown in FIGS. 3-5, a hole saw 1 in accordance with a first preferred embodiment of the present invention comprises a shaft 10, an adjustable outer cutter unit 20, and a hole-cutter 30.

The shaft 10 has a bottom coupling hole 11 axially inwardly extending from the bottom end of the shaft 10 for receiving a pilot drill (not shown), a top coupling rod 12 for fastening to a driving tool (not shown), an outer thread 14 extending around the periphery of the lower portion of the shaft 10 for the connection of the hole-cutter cutter 30, a screw hole 15 transversely extending across the bottom coupling hole 11 at the bottom side of the top coupling rod 12, and a lock screw 16 threaded into the screw hole 15.

The adjustable outer cutter unit 20 comprises two locating rods 22, two cutters 24, and two tightening up screws 244. The two locating rods 22 are perpendicularly affixed to the shaft 10 at two sides below the top coupling rod 12 and aligned in line. The cutters 24 each have a mounting through hole 241 transversely cut through the body thereof and respectively coupled to the locating rods 22, a top screw hole 242 vertically formed in the top side in communication with the mounting through hole 241, and a cutting edge 243 formed on the bottom side of the body thereof for cutting a notch (see FIG. 6). The tightening up screws 244 are respectively threaded into the top screw holes 242 of the cutters 24 to lock the cutters 24 to the locating rods 22.

The hole-cutter 30 has a top center inner thread 32 threaded onto the outer thread 14 of the shaft 10.

Figure 6:
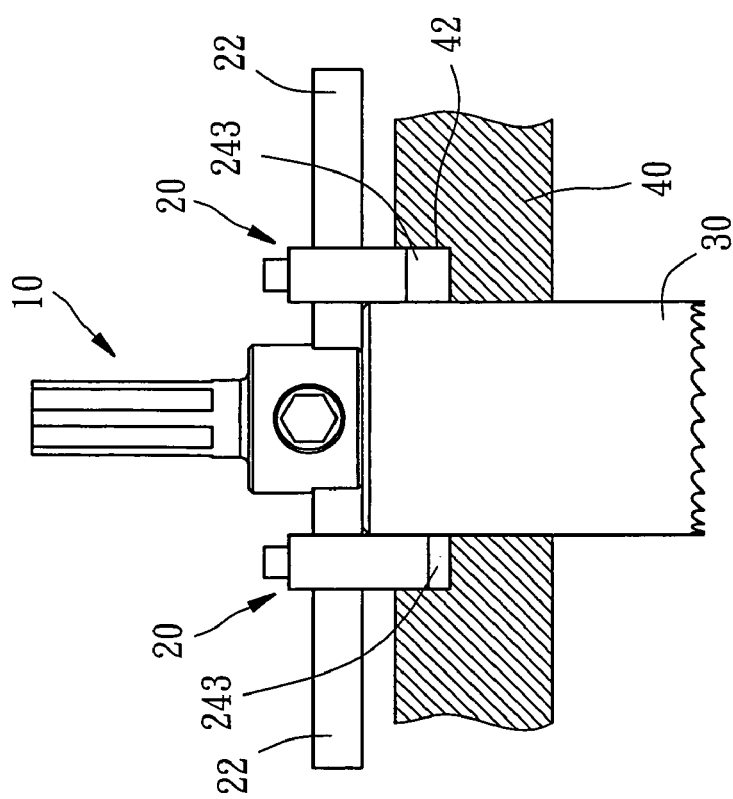
FIG. 6 is a schematic drawing showing an application example of the hole saw according to the first preferred embodiment of the present invention.

Referring to FIGS. 3 and 4, when using the hole saw to cut holes, the selected pilot drill is fastened to the bottom coupling hole 11 of the shaft 10, and then the lock screw 16 is threaded into the screw hole 15 to lock the pilot drill, and then the inner thread 32 of the hole-cutter 30 is threaded onto the outer thread 14 of the shaft 10, and then the cutters 24 are respectively coupled to the locating rods 22 and adjusted to a desired location, and then the tightening up screws 244 are respectively threaded into the top screw holes 242 to lock the cutters 24 to the locating rods 22 for allowing the cutters 24 to be moved with the shaft 10 and the hole-cutter 30 by the driving tool (not shown), as shown in FIG. 6, so that the cutters 24 can cut a stepped countersinking hole 42 out of the plate member 40 after the hole-cutter 30 cut a circular hole out of the plate member 40.

Figure 7:
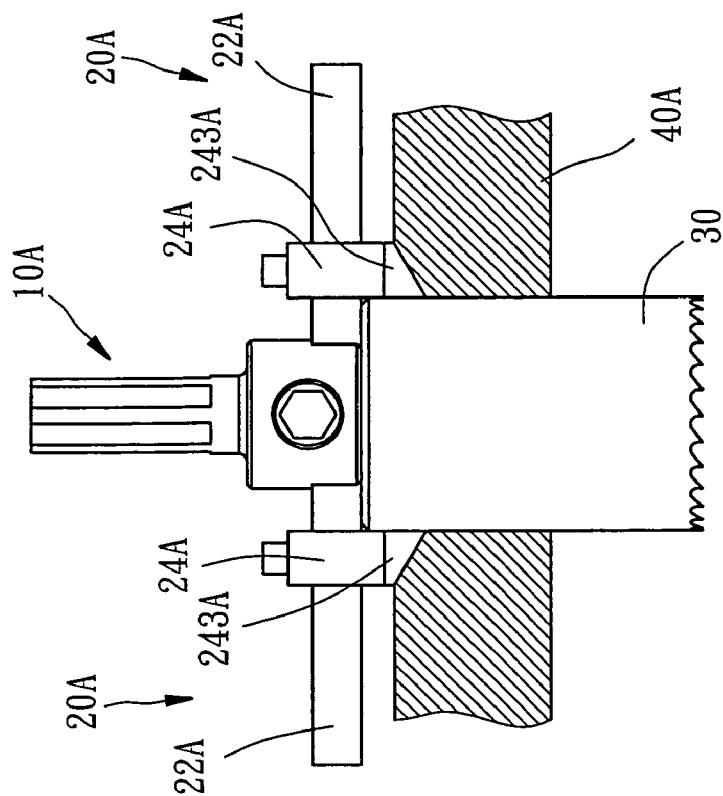
FIG. 7 is a schematic drawing showing an application example of a hole saw according to a second preferred embodiment of the present invention.

FIG. 7 is a schematic drawing showing an application example of a hole saw according to a second embodiment of the present invention. According to this embodiment, the cutting edge 243A of each cutter 24A of the adjustable outer cutter unit 20A extends from the body thereof with a sloping angle. After locking of the cutters 24A to the locating rods 22A at the shaft 10A, the cutters 20A can be driven to cut a taper-shaped countersinking hole out of a plate member 40A.

Figure 9:
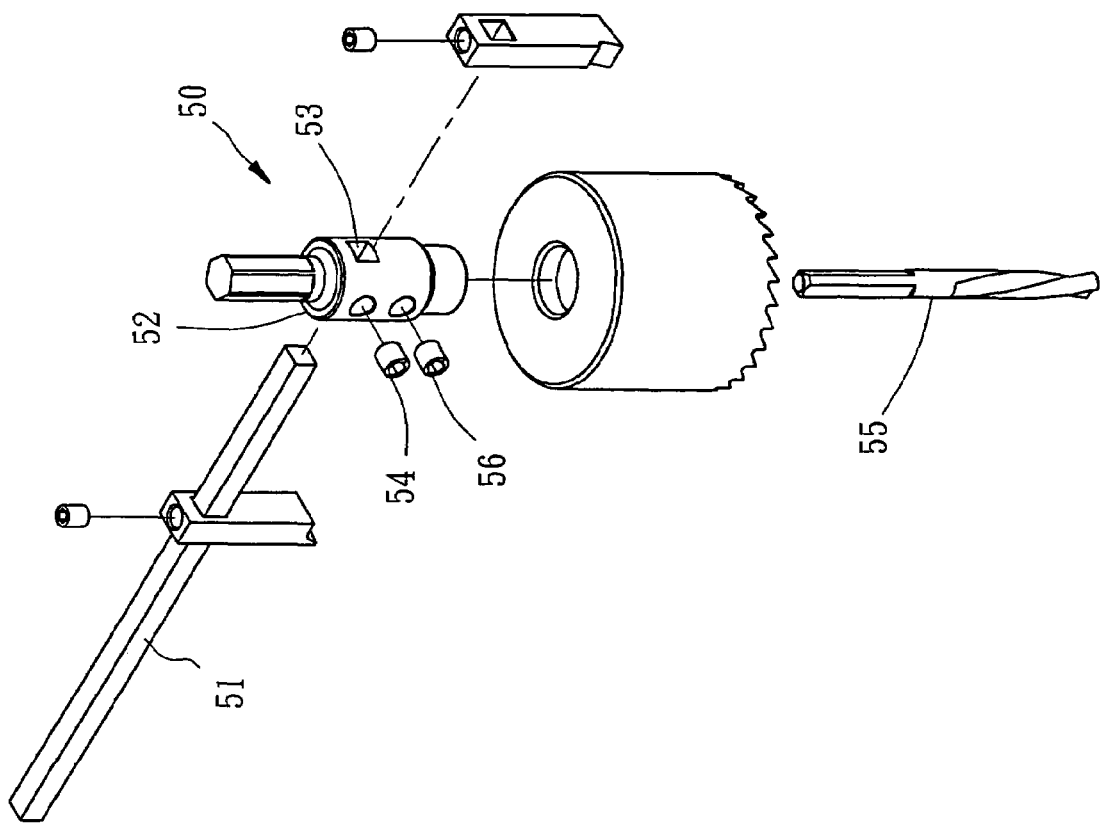
FIG. 9 is an exploded view of the hole saw according to the third preferred embodiment of the present invention.
Figure 8:
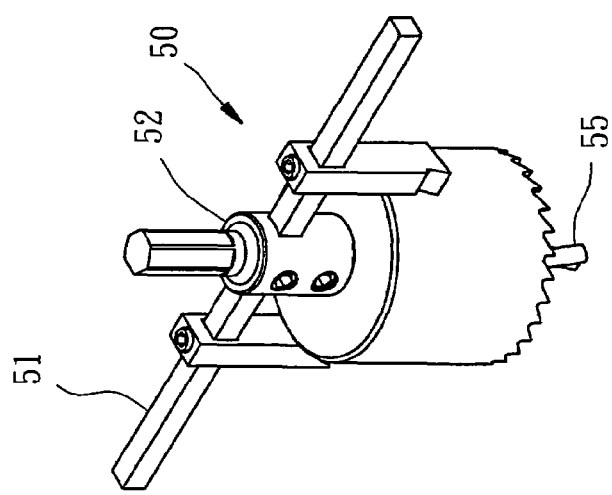
FIG. 8 is a perspective view of a hole saw according to a third preferred embodiment of the present invention.

FIG. 8 is a perspective view of a hole saw according to a third preferred embodiment of the present invention. FIG. 9 is an exploded view of the hole saw according to the third preferred embodiment of the present invention. According to this embodiment, the hole saw 50 uses only one single locating rod 51. The locating rod 51 is inserted through a transverse through hole 53 of the shaft 52 and locked thereto by a lock screw 54. The pilot drill 55 is locked to the shaft 52 with another lock screw 56. This embodiment achieves the same effects as the aforesaid first and second embodiments of the present invention.

Further, the shaft of the hole saw can hold one of a set of hole-cutters of different diameters.

As stated above, the invention provides a hole saw that has the benefits of a) the cutters of the adjustable outer cutter unit are adjustable along the locating rod(s) to cut different sizes of holes, b) the cutters of the adjustable outer cutter unit and the hole-cutter are separately replaceable when damaged, and c) the hole saw can be arranged to cut a countersinking hole or tapered notch when processing a circular hole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hole saw comprising:
    a shaft having a bottom coupling hole axially inwardly extending from a bottom end of the shaft for receiving a pilot drill, a top coupling rod for fastening to a driving tool, and an outer thread extending around a periphery of the shaft;
    a hole-cutter having a top center inner thread threaded onto the outer thread of the shaft; and
    an adjustable outer cutter unit having at least one locating rod transversely affixed to the shaft, and at least one cutter moveably and positionably mounted on a side of said at least one locating rod and abutted against an outer periphery of said hole-cutter.

2. The hole saw as claimed in claim 1, wherein the cutter of the adjustable outer cutter unit has a mounting through hole through which the locating rod is inserted, a screw hole in communication with the mounting through hole, and a tightening up screw threaded into the screw hole and stopped against the locating rod to lock the cutter to the locating rod.

3. The hole saw as claimed in claim 1, wherein the shaft has a transverse screw hole in communication with the bottom coupling hole, and a lock screw threaded into the transverse screw hole and stopped at the pilot drill for locking the pilot drill to the bottom coupling hole.

4. The hole saw as claimed in claim 1, wherein the cutter of the adjustable outer cutter unit has a bottom cutting edge extending from a bottom side thereof at an angle.

* * * * *